United States Patent [19]

Hammer et al.

[11] Patent Number: 4,670,273

[45] Date of Patent: Jun. 2, 1987

[54] ARTIFICIAL SAUSAGE CASING FOR SAUSAGES OF THE UNCOOKED SAUSAGE TYPE

[75] Inventors: Klaus-Dieter Hammer, Mainz; Hermann Winter; Ulrich Kinzler, both of Wiesbaden, all of Fed. Rep. of Germany

[73] Assignee: Hoechst Aktiengesellschaft, Frankfurt am Main, Fed. Rep. of Germany

[21] Appl. No.: 808,079

[22] Filed: Dec. 12, 1985

[30] Foreign Application Priority Data

Dec. 18, 1984 [DE] Fed. Rep. of Germany ... 8436989[U]

[51] Int. Cl.$^4$ .................. F16L 11/00; A22C 13/00
[52] U.S. Cl. ....................... 426/105; 428/36; 138/118.1; 426/135
[58] Field of Search .......... 428/36; 138/118.1; 426/105, 135

[56] References Cited

U.S. PATENT DOCUMENTS

| | | | |
|---|---|---|---|
| 3,818,947 | 6/1974 | Rose | 138/118.1 |
| 4,248,900 | 2/1981 | Hammer et al. | 138/118.1 |
| 4,528,225 | 7/1985 | Hutschenreuter et al. | 138/118.1 |
| 4,563,376 | 1/1986 | Hammer et al. | 428/36 |

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is an artificial sausage casing for sausages of the uncooked type which comprises a fiber-reinforced carrier tubing comprising regenerated cellulose and a coating applied to the inner surface of the carrier tubing. The coating comprises a water-insoluble, cured, cationic resin and gluconic acid-δ-lactone and, optionally, an oil. The carrier tubing includes a fiber-reinforcement having a coating of regenerated cellulose applied to both surfaces thereof. Preferably, the outer cellulose coating includes from about 10 to 20% by weight, relative to the weight of the sausage casing, of a pigment. The inner cellulose coating is substantially free from pigments. Also disclosed is an uncooked sausage which comprises an artificial sausage casing, as described above, and a sausage material contained in the sausage casing.

11 Claims, 2 Drawing Figures

ARTIFICIAL SAUSAGE CASING FOR SAUSAGES OF THE UNCOOKED SAUSAGE TYPE

BACKGROUND OF THE INVENTION

The present invention relates to an artificial sausage casing for sausages of the uncooked sausage type which comprises an internal coating of a water-insoluble cured cationic resin and, optionally, a natural or synthetic oil.

A sausage casing of this kind has been disclosed by European Patent Application No. 0,088,308. It is known that uncooked sausages, which include fermented sausages, dry sausages or salami-type sausages, are rendered imperishable by smoking and air-drying. In air-drying processes, the outer surface of the sausage casing is provided with a mold overlay, and the sausages are air-dried for several weeks or even months. These long periods of storing involve some problems, for, in the course of storing, cellulose casings become more or less spotty. In particular, white-pigmented casings assume a yellowish or grey hue. The outward appearance of a sausage is, of course, an important factor with regard to its acceptance by the consumer. Therefore, any color changes occurring during drying and storing are absolutely undesirable, even if the effect is only one of appearance and not the functioning of the sausage casing.

The undesirable effect noted above is probably caused by components of the sausage meat which, in the course of the storing, gradually migrate into the wall of the casing.

SUMMARY OF THE INVENTION

It is, therefore, an object of the present invention to provide an improved sausage casing of the uncooked sausage type.

A further object of the present invention is to provide a sausage casing of the type described above which prevents migration of sausage meat components into the casing without adversely affecting any of the other properties of the casing.

A still further object of the present invention is to provide a sausage casing having the above-noted properties, which still ensures that the ripening and air-drying process of the sausage proceeds normally.

An additional object of the present invention is to provide a sausage casing which achieves the above objects in a simple and economically reasonable manner and that no additional process steps are necessary in the production of the sausage casing.

Still an additional object of the present invention is to provide a sausage casing of the above type in which the substances used to treat the sausage casing must be acceptable for food wrapping and must be tasteless.

Therefore in accordance with one aspect of the present invention, there is provided an artificial sausage casing for sausages of the uncooked sausage type, comprising a fiber-reinforced carrier tubing which comprises regenerated cellulose, and a layer applied to the inner surface of the carrier tubing which includes a water-insoluble, cured, cationic resin and gluconic acid-δ-lactone.

Preferably, the carrier tubing comprises a fiber reinforcement having an outer and inner coating of regenerated cellulose applied to either side of the fiber reinforcement. The outer cellulose coating preferably comprises from about 10-20% by weight, relative to the total weight of the sausage casing, of a pigment. Advantageously, the inner cellulose coating is substantially free of pigments.

It is also preferred if the water-insoluble cationic resin comprises a condensation product of epichlorohydrin and a polyamine, polyamide, or a polyamine-polyamide.

Advantageously, the inner surface layer additionally comprises an oil. The oil is preferably a triglyceride mixture of saturated fatty acids having a chain length of from about 4 to 14 carbon atoms. More preferably, the inner surface layer comprises from about 30 to 200 mg/m$^2$ of the resin, at least 100 mg/m$^2$ of the lactone, and from about 100 to about 400 mg/m$^2$ of the oil.

In accordance with another aspect of the present invention, there is provided an uncooked sausage, comprising an artificial sausage casing as described above and an uncooked sausage material contained in the sausage casing which can be provided with a mold overlay.

Further objects, features, and advantages of the present invention will become more apparent to the person of ordinary skill in the art after reviewing the detailed description of the preferred embodiments which follows, when considered in view of the figures of drawing.

DETAILED DESCRIPTION OF PREFERRED EMBODIMENTS

Figure 1:
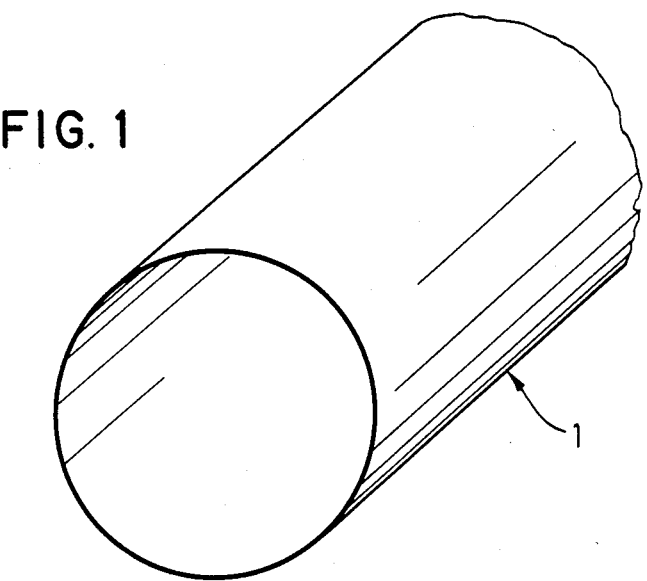
FIG. 1 is a schematic illustration of the present casing.

Surprisingly, the objects of the present invention are accomplished by providing the inner surface of the sausage casing with a coating which comprises a water-insoluble, cured, cationic resin, with an admixture of gluconic acid-δ-lactone. Up to this point, lactone has been used for a completely different purpose, namely, for promoting protein coagulation. The lactone is an inner ester of gluconic acid and is readily available commercially. The water-insoluble cationic resin preferably is a condensation product of epichlorohydrin and a polyamine, a polyamide or a polyamine-polyamide. The oil, in particular, is a triglyceride mixture of saturated fatty acids having chain lengths of about 4 to 14 carbon atoms.

The production of the sausage casing is based on the known viscose process. The viscose optionally contains pigments, such as titanium dioxide particles, which are required for the formation of a white or otherwise colored sausage casing. The viscose is preferably applied to both surfaces of a fiber insert, in particular paper, which is formed into a tubing. It has proved to be especially advantageous in the production of pigmented sausage casings, if only the viscose intended for the formation of the outer coating of regenerated cellulose is provided with the pigment particles. In general, the proportion of added pigments varies between about 10 and 20% by weight, relative to the total weight of the tubular cellulose casing. The amount of viscose which is to be applied to the inner surface of the fiber tubing for forming the inner cellulose coating, should be approximately as high as the amount of viscose which is to be applied to the outer surface of the fiber tubing, so that the resulting coatings of regenerated cellulose have about the same thickness. Usually, the weight ratio of the outer viscose coating to the inner viscose coating is between about 6:4 and 4:6.

The fiber or paper tubing provided with the viscose coating is then treated with coagulation or regeneration liquid in the known manner. A tubing of fiber-reinforced cellulose hydrate gel is obtained. The inner surface of the gel is coated with an aqueous solution of the still water-soluble cationic resin. The solution also contains the gluconic acid-δ-lactone and, optionally, the natural or synthetic oil added to the solution in the form of an emulsion. The concentration of the resin is between about 1 and 5% by weight, the concentration of the lactone preferably is between about 2 and 7% by weight, and the concentration of the oil components preferably is between about 1 and 8% by weight, in each instance related to the weight of the total aqueous solution. Furthermore, it is expedient to add an appropriate plasticizer, particularly glycerol, in a customary concentration, to the solution, so that a separate plasticizer bath can be avoided.

Part of the aqueous solution penetrates into the cellulose material of the carrier tubing. In the subsequent drying process, the carrier material is largely dehydrated. By the heating action, the cationic resin is heat-cured and forms a water-insoluble coating on the inner surface of the carrier tubing. The inner surface layer also includes the gluconic acid-δ-lactone and the oil component, part of which migrates onto the outer surface of the layer, i.e., in the direction of the interior of the tubing.

After drying, the sausage casing is remoistened, until a customary water content, for example, about 10 to 20% by weight, is reached. The casing is then processed into individual sections which are tied off at one end or processed into shirred sticks.

Using tubings having a diameter of more than about 50 mm, which are customary for uncooked sausages, about 30 mg to 20 mg of cationic resin and about 100 mg to 400 mg of oil are appropriately employed per m$^2$ surface area. Measurement is thereby performed as described in European Patent Application No. 0,088,308. In order to achieve the desired effect, the content of gluconic acid-δ-lactone preferably is at least about 100 mg/m$^2$. To guarantee this effect, it is, however, particularly preferred to use from about 200 mg/m$^2$ to 500 mg/m$^2$ of the lactone. This value can, for example, be calculated from the difference between the coating weight and the proportion of cationic resin and oil. It is also possible to determine the lactone content directly. For this purpose, a sample is extracted with hot water for about 30 minutes and the extract is then subjected to an iodometric analysis in accordance with J. Appl. Polym. Sci. 16(8), pp. 1873–1886. Alternatively, the extract is treated with a mixture of glacial acetic acid/$H_2O_2$/ammonium molybdate. The optical rotation is measured by means of a polarimeter. The lactone concentration is determined using a calibration curve (in accordance with R. Hamm and F. Schneider in "Deutsche Lebensmittelrundschau", German Food Review, 64(7), pp. 207–210 (1968).

Figure 1A:
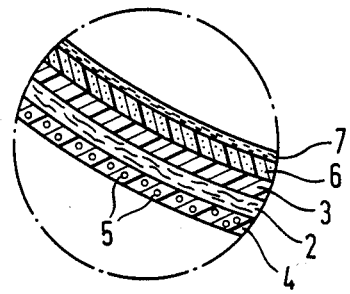
FIG. 1A is an enlarged sectional view of the casing wall of the casing.

FIG. 1 generally shows the present casing 1. FIG. 1A shows a sectional view of the sausage casing 1 and an enlarged sectional view "A" of the casing wall. The wall is comprised of a fiber insert 2 and an inner layer 3 and an outer layer 4 of regenerated cellulose. A white pigment 5 is contained in the outer layer 4. A continuous coating 6 comprising cured cationic resin, oil and gluconic acid-δ-lactone, and a coating 7 comprising migrated oil, which need not be continuous, are applied to the inner coating 3 of regenerated cellulose.

Due to the addition of the water-soluble, easily accessible gluconic acid-δ-lactone, it has become possible to avoid the undesired discoloration and spot formation on uncooked sausages, in particular, if white-pigmented cellulose casings are used during the ripening, air-drying and storing of the uncooked sausages. No extra process steps or other changes in the production process of the cellulose casings are required to apply this substance.

What is claimed is:

1. An artificial sausage casing for sausages of the uncooked sausage type, comprising:
   a fiber-reinforced carrier tubing which comprises regenerated cellulose; and
   a layer applied to the inner surface of the said carrier tubing, said layer comprising a water-insoluble, cured cationic resin and gluconic acid-δ-lactone.

2. A sausage casing as claimed in claim 1, wherein said carrier tubing includes a fiber reinforcement and an outer coating and an inner coating of regenerated cellulose applied to said fiber reinforcement, wherein said outer cellulose coating comprises from about 10 to 20% by weight, relative to the weight of the sausage casing, of a pigment.

3. A sausage casing as claimed in claim 2, wherein said inner cellulose coating is substantially free from pigments.

4. A sausage casing as claimed in claim 1, wherein said water-insoluble, cationic resin comprises a condensation product of epichlorohydrin and a polyamine, polyamide, or a polyamine-polyamide.

5. A sausage casing as claimed in claim 1, wherein said inner cellulose coating further comprises an oil.

6. A sausage casing as claimed in claim 5, wherein said oil comprises a natural oil.

7. A sausage casing as claimed in claim 5, wherein said oil comprises a synthetic oil.

8. A sausage casing as claimed in claim 5, wherein said oil comprises a triglyceride mixture of saturated fatty acids having a chain length of from about 4 to 14 carbon atoms.

9. A sausage casing as claimed in claim 1, having a diameter of more than about 50 mm, wherein said inner surface layer comprises from about 30 to about 200 mg/m$^2$ of surface area, of said resin and from about 100 to about 400 mg/m$^2$ of surface area, of said lactone.

10. A sausage casing as claimed in claim 5, having a diameter of more than about 50 mm, wherein said inner surface layer comprises from about 30 to about 200 mg/m$^2$ of surface area, of said resin, and from about 100 to about 400 mg/m$^2$ of surface area, of said oil.

11. An uncooked sausage, comprising:
   an artificial sausage casing as claimed in claim 1; and
   an uncooked sausage material contained in said sausage casing.

* * * * *